C. B. SEWELL.
COTTON HARVESTER.
APPLICATION FILED FEB. 16, 1910.
973,712.
Patented Oct. 25, 1910.
3 SHEETS—SHEET 2.
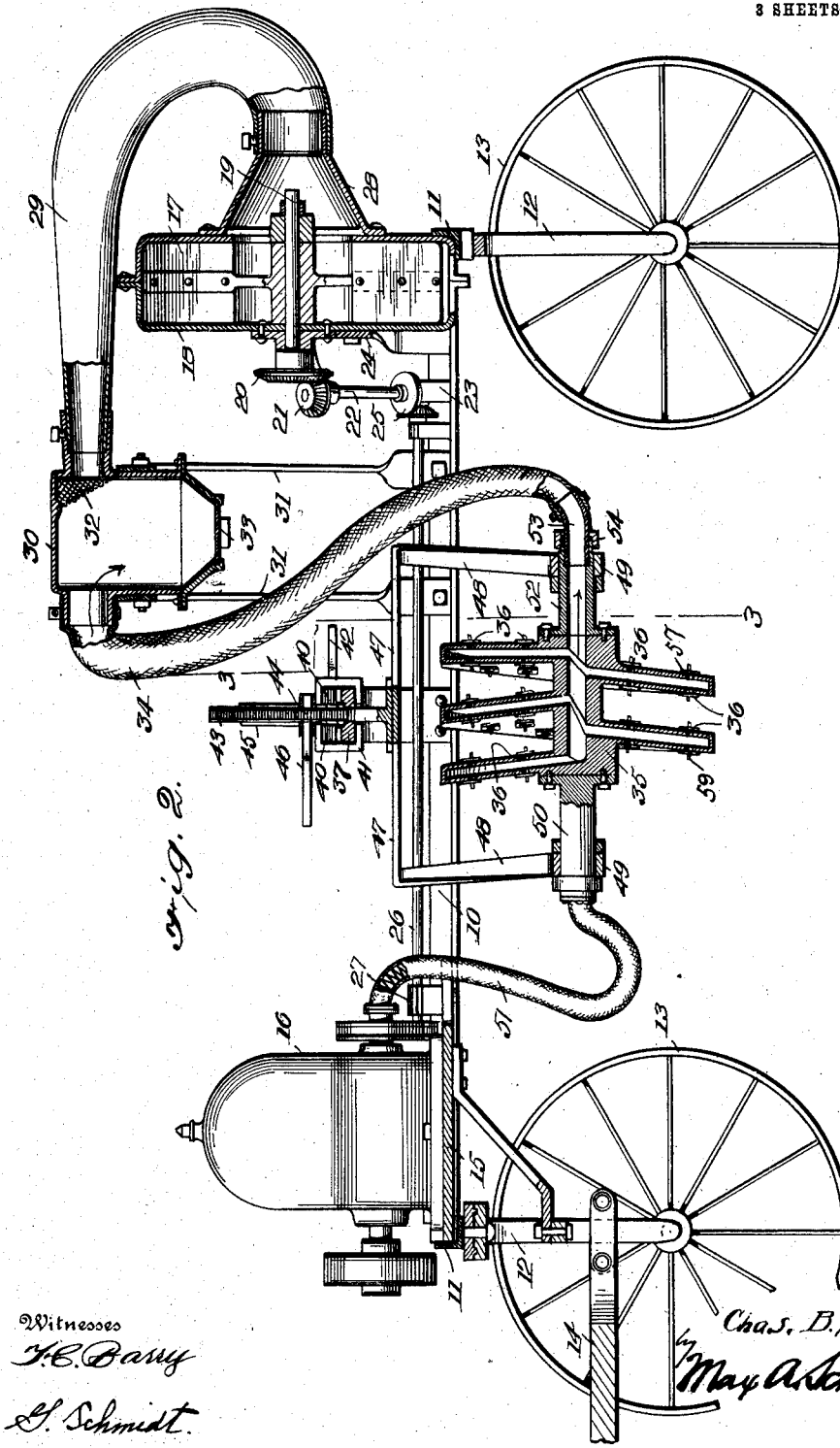
Witnesses
F. C. Barry
G. Schmidt.
Inventor
Chas. B. Sewell
by May A. Schmidt
Attorney

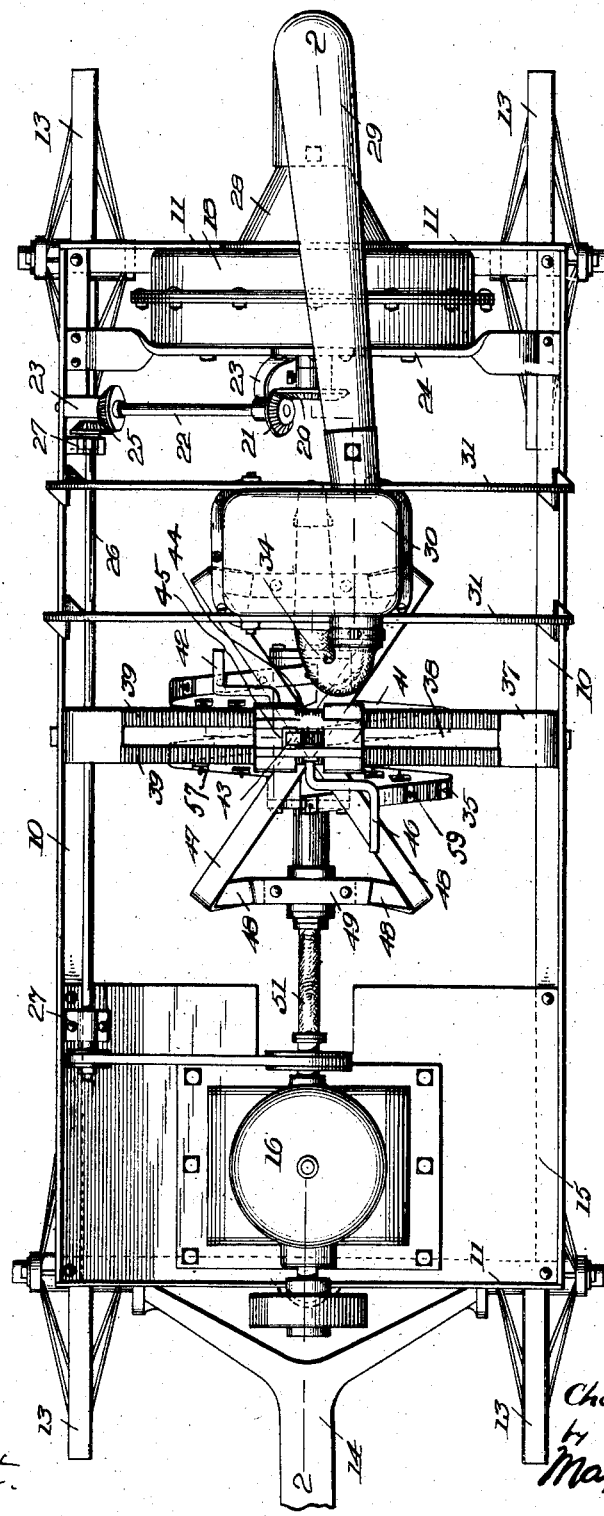

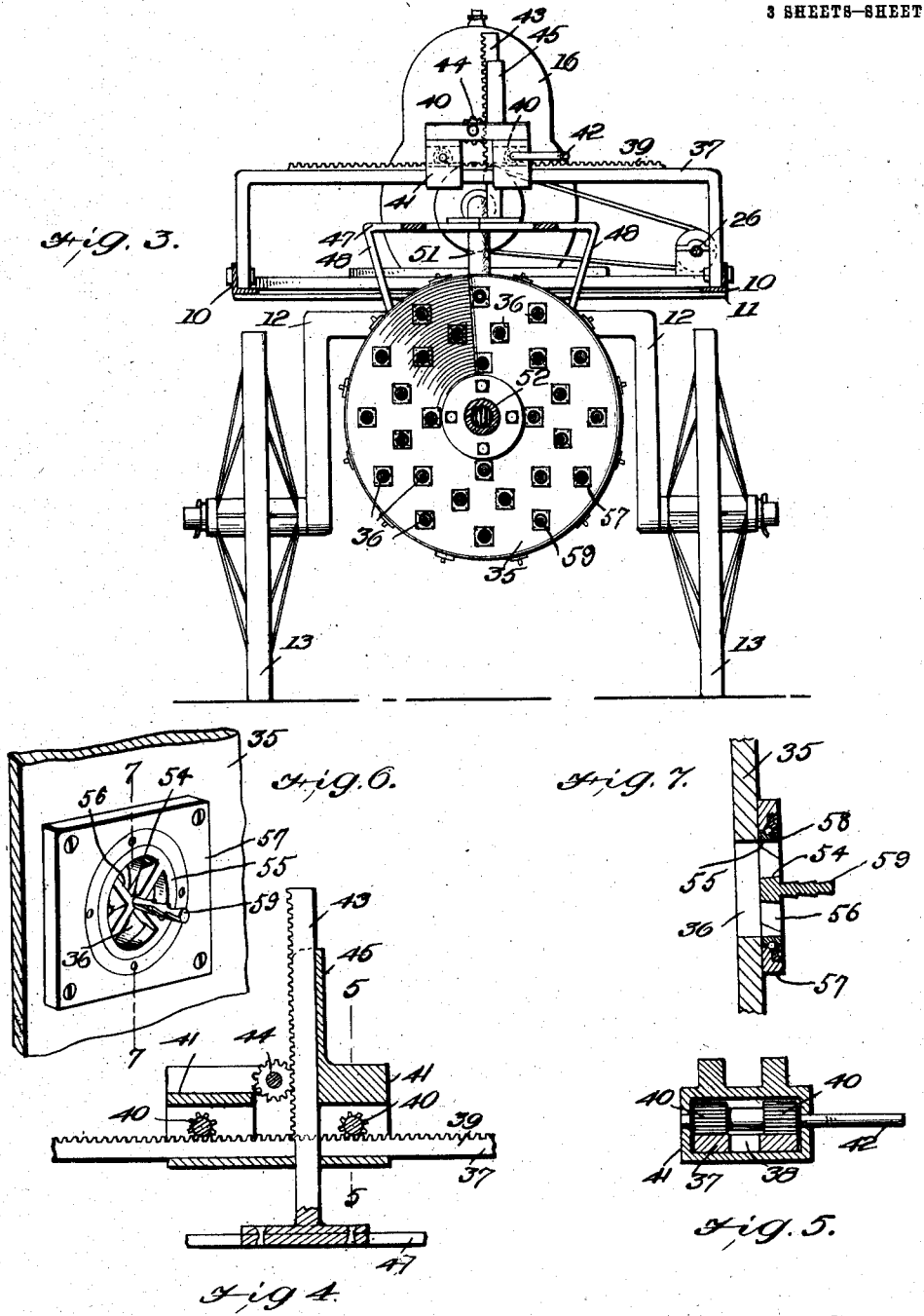

UNITED STATES PATENT OFFICE.

CHARLES B. SEWELL, OF SHARON, TEXAS.

COTTON-HARVESTER.

973,712.  Specification of Letters Patent.  Patented Oct. 25, 1910.

Application filed February 16, 1910. Serial No. 544,239.

*To all whom it may concern:*

Be it known that I, CHARLES B. SEWELL, a citizen of the United States, residing at Sharon, in the county of Scurry and State of Texas, have invented certain new and useful Improvements in Cotton-Harvesters, of which the following is a specification.

This invention relates to cotton harvesters of that type in which the cotton is removed from the bolls by pneumatic suction means, and delivered into a receptacle.

It is the object of the invention to provide in a harvester of the kind stated, an improved suction head which is so constructed and operated that it winds its way through the plants and operates on a large area to remove the cotton from a number of bolls simultaneously, by reason of which the cotton can be more rapidly gathered than with an apparatus employing a suction head or nozzle which operates on one boll at a time.

The invention also has for its object to provide improved means for guiding the suction head.

With the herein stated objects in view, the invention consists in a novel construction and arrangement of parts to be hereinafter described and claimed, reference being had to the drawings hereto annexed forming a part of this specification, in which drawing,—

Figure 1 is a plan view of the machine. Fig. 2 is a side elevation, parts being shown in section on the line 2—2 of Fig. 1. Fig. 3 is a cross-section on the line 3—3 of Fig. 2. Fig. 4 is a sectional detail of the means for adjusting the suction head or nozzle. Fig. 5 is a cross-section on the line 5—5 of Fig. 4. Fig. 6 is a perspective view of the rotating picker stem and the means for actuating the same. Fig. 7 is a transverse section on the line 7—7 of Fig. 6.

Referring to the drawings, it will be seen that the picking mechanism is carried on a wheeled frame, or vehicle, adapted to be drawn across the field by draft animals; or it may be self-propelled by providing a driving mechanism, geared to the motor which actuates the picking mechanism. The wheeled frame is rectangular in form, and comprises side bars 10, and end bars 11 which are angular in cross section. The end bars carry arched axles 12 on which the supporting wheels 13 of the frame are mounted, the front axle being pivoted for guiding the machine, and to said axle is attached a tongue 14 for the draft animals. The front end of the frame carries a platform 15 on which a motor 16 is mounted and supported. This motor may be an internal-combustion engine, and its function is to operate the suction apparatus.

At the rear end of the wheeled frame is carried a rotary exhaust fan 17 mounted in a case 18. On the shaft 19 of the fan is a bevel gear 20, which meshes with a bevel gear 21 on a shaft 22 supported by brackets 23, one of which brackets is carried by one of the side bars 10, and the other by an arched brace 24 rising from the side bars, said arch also serving to secure the fan case. The shaft 22 is geared by bevel gears 25 to a countershaft 26 extending parallel to one of the side bars 10 and supported in bearings 27 mounted thereon. The countershaft extends to the front end of the frame, and is belted or otherwise operatively connected to the motor 16, as shown in Fig. 1, whereby the fan is driven from said motor through the herein-described gearing.

Over the eye of the fan case 18 is mounted a funnel-shaped casing 28, to which is connected a pipe 29 leading to and entering a suction box 30 carried by arches 31 rising from the side bars 10. The cotton is adapted to be sucked into this box as will be presently made clear, and to prevent the cotton from being taken up by the pipe 29, a screen 32 is placed across the mouth thereof. The bottom of the box has an opening for the removal of the cotton, said opening being provided with a sliding gate, or other suitable closure 33.

The suction pipe which carries the cotton into the box 30 is indicated at 34, said pipe being connected to a suction head or nozzle 35 comprising a hollow body which is helical in form, the wall of the body having a large number of inlet openings 36. These openings are in the edge, as well as in the sides of the convolutions of the helix.

Extending transversely of the machine, and supported by the side bars 10, is a horizontally disposed bar 37 having a slot 38 extending in the direction of its length. The top of the bar, on opposite sides of the slot, is formed into a rack 39, engageable by pinions 40 carried by a housing 41 through which said bar passes. Two pairs of pinions are provided, located respectively near the ends of the housing. The shafts of the pinions are mounted in the side walls of the housing, and on the outside thereof, one of said shafts is fitted with a crank-handle 42, which, upon being turned, rotates the pinions of said shaft and, through the rack 39, slides the housing along the bar 37, said sliding movement being transversely of the machine. The housing 41 also carries a vertically disposed rack bar 43, and a pinion 44 in mesh therewith. From the top of the housing rises a post 45 having a groove in which the rack bar works, whereby it is guided. The shaft of the pinion 44 is fitted with a crank-handle 46 which, upon being turned, rotates the pinion and raises or lowers the rack bar. The rack bar 43 passes through the slot 38, and through an opening in the bottom of the housing, and carries at its lower end a support for the suction head 35. Said support comprises a pair of crossed arms 47 having downward bends 48 at their ends, and said ends carry bearings 49. In one of said bearings is journaled a short shaft 50 secured at one end to one end of the suction head, and having secured to its other end a flexible shafting 51 connected to the drive shaft of the motor 16. To the other end of the suction head is fastened a short hollow shaft 52 which is journaled in the other bearing 49. The bore of the shaft 52 communicates with the interior of the suction head, and the outer end of said bore is entered by a nipple 53, connected to the pipe 34. A stuffing box 54 is provided to prevent leakage of air.

In front of each inlet opening 36 is mounted a fan comprising a hub 54, a rim 55, and radial blades 56 extending therebetween, the latter being set obliquely to throw the cotton into the opening 36. The fan is mounted in an opening made in a plate 57 bolted or otherwise secured to the head 35. A ball bearing 58 is provided to reduce friction. From the hub of the fan, on the outer side thereof, projects axially a stem 59 having a barbed or roughened surface, the barbs being presented toward the fan. The stems rotate with the fan.

In operation, the machine is drawn across the cotton field by the draft animals, it being guided so that the suction head will enter the plants. The suction head is rotated by the motor 16 through the flexible shafting 51. The fan 17 is driven by the motor 16 through the gearing already described. This creates a suction in the head 35 and causes air to be drawn thereinto through the fans and the openings 36. The air passing through the fans causes the latter to rotate. The stems 59 rotate with the fans and their barbed surfaces catch the cotton and pull it from the bolls. The cotton is sucked off the stems by the draft and passes through the fans and the openings 36 into the head, from which it passes into the bore of the shaft 52, and thence through the pipe 34 to the box 30. When the latter is full, the gate 33 is opened, and the cotton is allowed to drop into a bag or other suitable receptacle. The rotary motion of the head 35 causes it to wind its way through the plants, reaching all the parts thereof, and operating on a large area. By providing a plurality of picker stems and inlet openings 36, a large number of bolls are operated on simultaneously by reason of which the speed of operation is greatly increased, and the cotton is gathered more rapidly than with a machine in which the suction head or nozzle has to be guided to the bolls, and operating on them singly. The axles 12 elevate the suction head a sufficient distance from the ground so that it may enter the plants as stated. Lateral and vertical adjustment of the head 35 is readily effected by operating the crank handles 42 and 46, the former causing the housing 41 to travel along the bars 37, and the latter raising or lowering the rack bar 43, and as the latter carries the supporting means of the head, the latter is raised and lowered with the rack bar. The transverse movement of the housing 41 moves the rack bar bodily transversely of the machine, thereby effecting transverse adjustment of the head. In order to permit this vertical and lateral adjustment of the head, the flexible shafting 51 is employed, and the pipe 34 is also a flexible one.

A machine constructed and operated as herein described is efficient in operation, and it effectually serves the purpose for which it is designed.

The preferred embodiment of the invention has been herein shown and described, but it will be understood that various minor changes in the structural details thereof may be resorted to without departing from the spirit of the invention.

I claim:—

1. In a cotton harvester, a hollow helical suction head having a plurality of inlet openings, a suction pipe connected to the head, and means for rotating the head.

2. In a cotton harvester, a hollow helical suction head having a plurality of inlet openings, a suction pipe connected to the head, means for rotating the head, and means for adjusting the head to the plants.

3. In a cotton harvester, a hollow helical suction head, having a plurality of inlet openings, a suction pipe connected to the head, means for rotating the head, and means for guiding the head in a vertical and a horizontal plane.

4. In a cotton harvester, a wheeled supporting frame, a transverse rack bar carried by the frame, a housing slidable on the rack bar, pinions carried by the housing and meshing with the rack bar, means for rotating the pinions, a vertically disposed rack bar, and a pinion in mesh therewith carried by the housing, means for rotating said pinion, a suction nozzle carried by the vertical rack bar, and a flexible suction pipe connected to the nozzle.

5. In a cotton harvester, a wheeled supporting frame, a transverse rack bar carried by the frame, a housing slidable on the rack bar, pinions carried by the housing and meshing with the rack bar, means for rotating the pinions, a vertically disposed rack bar and a pinion in mesh therewith carried by the housing, means for rotating said pinion, a rotatable helical suction nozzle carried by the vertical rack bar, and a flexible drive shaft and a flexible suction pipe connected to the nozzle.

6. In a cotton harvester, a wheeled supporting frame, a transverse rack bar carried by the frame, a housing slidable on the rack bar, pinions carried by the housing and meshing with the rack bar, means for rotating the pinions, a vertically disposed rack bar and a pinion in mesh therewith carried by the housing, means for rotating said pinion, a rotatable helical suction nozzle carried by the vertical rack bar, a flexible drive shaft and a flexible suction pipe connected to the nozzle, a suction box to which the suction pipe is connected, an exhaust fan having its case in communication with the suction box, and a motor carried by the supporting frame and operatively connected to the fan and the flexible drive shaft of the nozzle.

7. In a cotton harvester, a hollow helical suction head having a plurality of inlet openings, rotating picker stems mounted at the mouths of the openings, means for rotating the suction head, and means for rotating the picker stems.

8. In a cotton harvester, a hollow helical suction head having a plurality of inlet openings, rotary fans mounted in front of said openings, picker stems carried by the fans, and rotatable therewith, and means for rotating the suction head.

In testimony whereof I affix my signature in presence of two witnesses.

CHARLES B. SEWELL.

Witnesses:
CHARLES R. BUCHANAN,
A. W. BUCHANAN.